2,779,693
FRACTIONATION OF STARCH

Eugene Pacsu, Princeton, N. J., and Albert W. Bauer, Baltimore, Md., assignors to Textile Research Institute, Princeton Township, N. J., a corporation of New Jersey No Drawing. Application March 7, 1952, Serial No. 275,469

6 Claims. (Cl. 127—71)

This invention relates to methods for separating constituents of starch whereby the effectiveness of such separation is more nearly complete than has been possible heretofore and the purity of the products obtained is increased.

It is generally recognized that starch is composed essentially of two constituents which are frequently referred to as the "A-fraction" and the "B-fraction." Most starches contain about 15 to 35% of A-fraction, depending on their source, the remainder of the starch being the B-fraction.

The A-fraction is composed primarily of amylose which is a linear polymer believed to have a helical configuration. It is relatively insoluble in water and offers possibilities as a basic material for the production of synthetic fibers by acetylation. The B-fraction is composed primarily of amylopectin, which is a branched type of polymer. It is much more readily soluble in water and is useful in sizing fabrics, the production of pastes and puddings, and for many other purposes.

The manner in which the A and B-fractions are combined the starch molecule or granule has not been definitely established. They may be joined by hydrogen bonds, by coordinate linkages or by mechanical entanglement, or by a combination of these or other forms of attachment. The present invention may therefore be said to result in disaggregation of the A and B-fractions without attempting to explain the nature of the physical or chemical reactions which take place in effecting separation of the starch constituents.

Several methods have been suggested heretofore for separating the constituents of starch, but they have in general been so expensive and incomplete in operation as to be of little commercial value. Thus, for example, aqueous solutions containing from 1 to 3% of starch have been heated for a period of from 4 to 10 hours at 100° C., or they have been heated for 2 to 4 hours at higher temperatures in an autoclave. "Thin boiling starches" prepared in a conventional manner by acid treatment below the gelatinization temperature have used in somewhat higher concentrations in the autoclaving process. From starch solutions treated in any of these ways the A-fraction is precipitated by the action of alcohols and is separated by filtration or centrifuging. The yield of A-fraction obtained by such methods is generally only about 70% of theory and the iodine number, which may be taken as an indication of purity, is usually only 10 to 12 as determined by the method of Wilson, Schoch and Hudson (J. A. C. S., vol. 65, page 1381; 1943).

In accordance with the present invention substantially quantitative yields of A and B-fractions are obtained and their purity is improved as indicated by an iodine number for the A-fraction of 16 or more and an iodine number for the B-fraction which is usually about 1.0. Moreover, the concentration of the starch solutions treated can be increased and the temperature to which the solution is heated is below 100° C. so that no autoclaves are required and conventional and inexpensive equipment may be used.

These results are attained by dissolving starch in an alkaline solution having a pH value of from 13 to 14 and thereafter buffering the solution to a pH value below 11. Disaggregation of the starch constituents is then effected by heating the buffered solution to a temperature of at least 50° C. and preferably to temperatures of 60° C. or higher. Separation of the disaggregated constituents can then be effected in any suitable way as by precipitating the A-fraction by means of organic polar compounds which presumably form insoluble complexes with the A-fraction. The B-fraction may be recovered from the remaining solution by precipitation with alcohols.

One of the objects of the present invention is to provide simple and improved methods for the recovery of A and B-fractions from starch.

Another object of the invention is to obtain high yields of A and B-fractions of increased purity.

A specific object of the present invention is to provide an alkaline treatment of starch which is effective in preparing solutions suitable for use in disaggregating the constituents of starch.

These and other objects and features of the present invention will appear from the following description thereof in which typical and preferred procedures are described for the purpose of indicating the nature of the invention, but without intending to limit the scope of the invention thereto.

The type of starch used in the practice of the present invention does not appear to alter the effectiveness of the process and therefore starch derived from corn, wheat, potatoes or other grain or vegetables may be used in the form of unmodified or native starch granules or in the form of modified starches such as "thin boiling" starches.

The concentration of the starch in the solutions treated is preferably about 5% or higher although difficulties are encountered in effecting separation of the fractions due to the formation of a gel on cooling, if the amount of starch in solution is more than about 8% by weight.

The solution of the starch is effected by addition of sufficient alkali to dissolve the starch. For this purpose the pH value of the solution should be from 13 to 14, particularly when the starch concentration is in the neighborhood of 5% or more. Sodium or potassium hydroxide may be used, for example, at concentrations of 0.1 to 1.0 normal and for most practical purposes solutions of about 0.5 normal sodium hydroxide are used for dissolving the starch. After dissolving the starch the solution is neutralized or buffered to a pH value below 11 and preferably about 5. Hydrochloric, sulfuric, phosphoric or other acids or suitable buffering agents may be used for this purpose. If the pH value is above 11, no precipitation of the A-fraction is effected on subsequent treatment with alcohol, whereas buffering below about pH 3 does not appear to serve any useful purpose.

The buffered solution is heated and while the disaggregating action takes place very slowly at temperatures as low as 50° C., it takes place much more rapidly at temperatures of 60° C. or higher. The heating is usually carried out at a temperature of from about 85° to 95° C. and may be continued for a period of from a few minutes to about 5 or 6 hours. In general, heating for at least ½ hour is preferred and longer periods of heating are usually desirable when the pH value of the solution is high than when it is in the neighborhood of 4 to 6. Moreover, longer periods of heating are usually advantageous when the concentration of the starch in the solution is relatively high.

During the step of heating the solution there is a marked decrease in viscosity indicating that disaggregation is taking place. When no further reduction in viscosity occurs as the heating continues it is considered the disaggregation has been completed.

The importance of the step of buffering the solution prior to heating is indicated by the fact that heating of starch solutions having a pH value above 11 does not result in any pronounced decrease in viscosity. Moreover, the addition of butanol or other precipitating agents to solutions of such high pH value does not cause precipitation of the A-fraction even after prolonged heating. It is therefore apparent that the desired disaggregation will not take place in starch solutions having a pH value above about 11.

Precipitation of the A-fraction from the heated solution can be effected in any suitable way, as by the use of any of the known organic polar substances which form insoluble complexes with the A-fraction. Among these precipitants are the water soluble alcohols such as methanol, ethanol, propanol, butanol and pentasol. However, other hydroxy compounds including cyclohexanol and thymol may be used. The precipitant may be added either before or after heating since no precipitation will take place until the heated solution is cooled down to a temperature below about 20° C. In most instances, precipitation is accomplished by cooling the solution to about 4° C. or by allowing the solution to stand at room temperature for periods up to several days. Separation of the A-fraction thus precipitated can be effected by filtering or centrifuging. The B-fraction can readily be obtained as a precipitate from the filtered liquid by the addition of methanol, using from 1 to 3 volumes of methanol for each volume of B-fraction containing liquid.

The fractions obtained in each instance are washed with alcohol and ether and dried. The yield of A-fraction obtained equals about 25% of the original starch, whereas the B-fraction is about 75% of the starch. The purity of the fractions obtained in this way is evidenced by the high iodine number of the A-fraction, usually about 16, and the low iodine number for the B-fraction, usually about 1 or lower In order to indicate typical procedure in accordance with the present invention, the following examples are cited:

Example I 25 grams of unmodified corn starch granules are dissolved in 500 mls. of a 1.0 normal solution (pH 14) of sodium hydroxide without heating. The solution was then buffered to a pH value of 4 using a 50% solution of phosphoric acid. 50 ml. of butanol were then added and the solution was heated to 92° C. for 5 hours. It was then cooled to room temperature and refrigerated overnight at 5° C. The A-fraction which precipitated was separated from the remaining solution by centrifuging and the B-fraction solution was treated with two volumes of methanol. The B-fraction was thus precipitated and filtered from the supernatant liquid. Both fractions were washed with methanol and ether.

6.25 grams of A-fraction were thus obtained having an iodine number of 16.2, whereas 18.75 grams of B-fraction were obtained having an iodine number of 0.85.

Example II

2% by weight of unmodified corn starch was dissolved in 0.1 normal (pH 13) potassium hydroxide with mild heating and the solution adjusted to pH 4 with hydrochloric acid. Butanol was added to the solution which was then heated for one hour at 85° C. On cooling to room temperature, the A-fraction precipitated and the B-fraction was recovered from the solution by addition of methanol. The yield of A-fraction was 20.4% based on the weight of the starch treated and the B-fraction was 79.6%. The iodine number of the A-fraction was 16.6, whereas the iodine number of the B-fraction was 1.8.

The manner in which the method is carried out in all other respects is capable of wide variations. Thus, concentration of the starch solution, the type and amount of buffering agent used and the duration of heating can be altered within wide limits. The stage at which the butanol or other precipitant is added in the process and the manner of precipitation and separation of the fractions from the solutions are also capable of variation. In view thereof, it should be understood that the particular examples and embodiments of the invention described are intended for purposes of illustration only and are not intended to limit the scope of the invention.

We claim:

1. The method of obtaining the A-fraction of starch which comprises the steps of dissolving starch in an alkali hydroxide solution having a pH value of from 13 to 14, buffering the solution to a pH value below 11, heating the solution to a temperature of from 60° to 95° C., thereafter cooling the solution and precipitating the A-fraction therefrom with an organic polar agent which will form an insoluble complex with the A-fraction, and removing the precipitate from the solution.

2. The method of obtaining the A-fraction of starch which comprises the steps of dissolving from 2 to 8% by weight of starch in a 0.1 to 1 normal solution of sodium hydroxide, buffering the solution with an acid to a pH value below 11, heating the solution to a temperature of from 60° C. to 95° C., cooling the solution and precipitating the A-fraction therefrom with a water soluble alcohol.

3. The method of obtaining the A-fraction of starch which comprises the steps of dissolving from 2 to 8% of unmodified corn starch in a 0.5 normal solution of sodium hydroxide, buffering the solution to a pH value below 11, heating the solution to a temperature of from 60° to 95° C. for a period of from a few minutes to 6 hours, cooling the solution, and precipitating the A-fraction therefrom with a water soluble alcohol.

4. The method of separating the B-fraction from starch which comprises the steps of dissolving starch in an aqueous caustic alkali solution having a pH value of from 13 to 14, buffering the solution to a pH value below 11, heating the solution to at least 60° C. and below 100° C., cooling the solution, precipitating and separating the A-fraction from the cooled solution, adding methanol to the solution to precipitate the B-fraction, and separating the latter therefrom.

5. The method of separating the A and B-fractions of starch which comprises the the steps of dissolving from 2 to 8% by weight of unmodified corn starch granules in an 0.5 normal sodium hydroxide solution, buffering the solution with hydrochloric acid to a pH value of from about 3 to 11, adding butanol to the solution, heating the solution to a temperature of from 60° to 95° C. for a period of from about ½ to 5 hours, cooling the solution to about 5° C., separating the resulting A-fraction precipitate from the solution, adding from 1 to 3 volumes of methanol to the separated liquid, and separating the resulting B-fraction precipitate from the liquid.

6. The method of separating the constituents of starch which comprises the steps of dissolving starch in an alkaline solution having a pH value of from 13 to 14, buffering the solution to a pH value below 11, heating the solution to a temperature above 50° C. and below 100° C., cooling the solution, precipitating the A-fraction from the solution with an organic polar agent which will form an insoluble complex with the A-fraction removing the disaggregated A-fraction from the solution, and separating the disaggregated B-fraction from the remaining solution.

(References on following page)

References Cited in the file of this patent

UNITED STATES PATENTS

| | | |
|---|---|---|
| 2,328,537 | Felton | Sept. 7, 1943 |
| 2,373,016 | Daly | Apr. 3, 1945 |
| 2,515,095 | Schoch | July 11, 1950 |
| 2,515,096 | Schoch | July 11, 1950 |

OTHER REFERENCES

Kerr: Chem. & Industry of Starch, 2nd Ed., N. Y., 1950, p. 195.

Chemistry and Industry of Starch by Ralph W. Kerr, Academic Press Inc., Pubrs., N. Y. (1950).

Journal of the Textile Institute, April 1949 (page 207).

The Fractionation of Starch by R. S. Higginbotham et al.